July 24, 1934.  M. D. McFARLANE ET AL  1,967,583
TRANSPARENCY METER
Filed Dec. 15, 1932
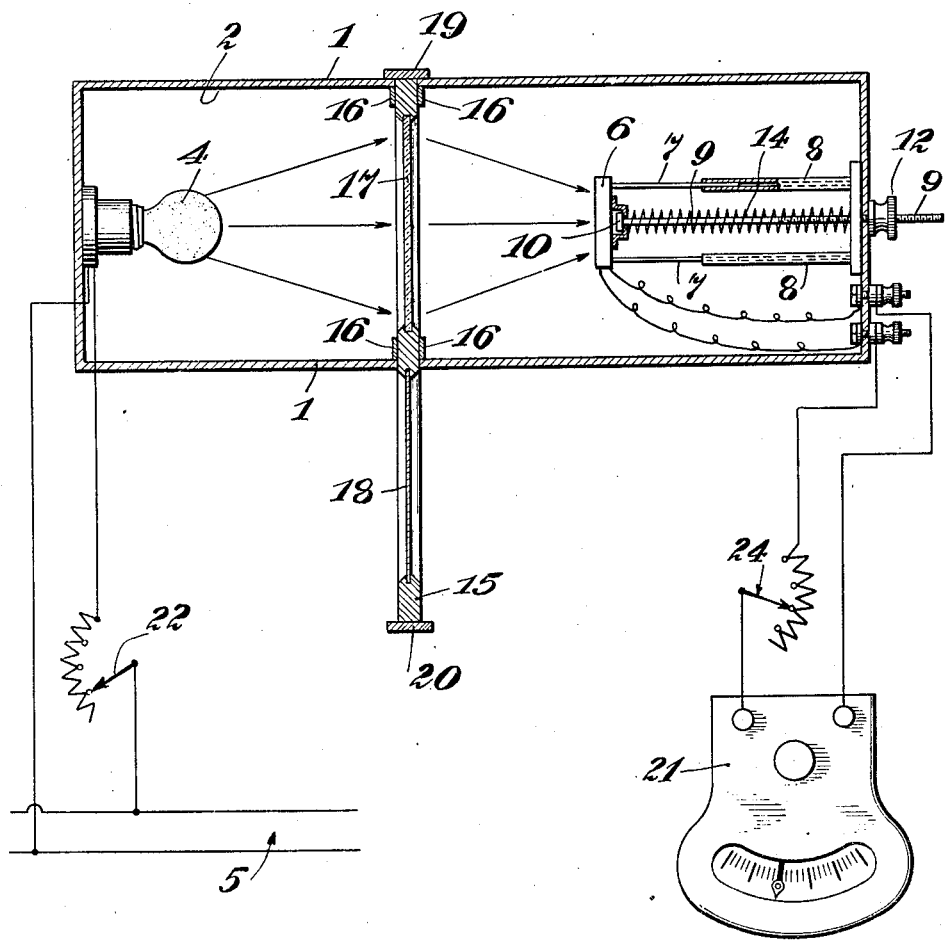
INVENTORS
Maynard D. McFarlane
and William Baumrucker, Jr.
By Ramsey & Kent
their ATTORNEYS Patented July 24, 1934

1,967,583

UNITED STATES PATENT OFFICE 1,967,583

TRANSPARENCY METER

Maynard D. McFarlane and William Baumrucker, Jr., New York, N. Y.

Application December 15, 1932, Serial No. 647,387

1 Claim. (Cl. 88—14)

The present invention relates to a transparency meter useful for determining the degree of transparency of sheet materials and more especially print paper.

One of the problems of the printing art, and more especially newspaper publishers, is to obtain a paper which is substantially opaque so that the printing on the opposite side of the paper does not show through. The quality of news print paper changes from time to time due to various reasons, one of which is the variation in the supply of raw materials used. It, therefore, becomes necessary to test the paper from time to time used in a newspaper plant to determine various characteristics and one of the tests is to determine the amount of "show-through" which is the term used in the art with reference to the opacity of the paper. The present invention while designed primarily for use with paper may be useful for determining the transparency or opaqueness of other materials.

The invention comprises primarily a construction including a source of light, preferably electric light, a photoelectric cell connected with a reading meter, and a standard of transparency against which the readings may be continually calibrated while the instrument is in use to obviate any changes which may occur either in the source of light or the photoelectric cell, and against which calibrated reading, the reading of the material tested may be determined.

Preferably, the standard material used for calibration comprises a sheet of opalescent glass. This opalescent glass may be calibrated against clear light by adjusting the distance between the photoelectric cell and the source of light to obtain a standard reading on the meter. It has been found that for paper testing, that a standard medium which transmits about ten percent of the light is a satisfactory standard.

After the photoelectric cell has been adjusted to determine the ten percent reading for the standard, the instrument is ready for operation. In testing paper, the opalescent glass is positioned between the source of light and the photoelectric cell. The reading on an electric meter connected with the photoelectric cell is checked. Then, the opalescent glass is immediately displaced by a sheet of paper which occupies the same position as was previously occupied by the opalescent glass. The reading through the paper is now noted, and the factor of transparency of the paper may be now determined. The paper transparency factor is obtained by dividing the meter reading for the paper by the meter reading of the opalescent glass and multiplying by the transmission factor of the opalescent glass.

It is to be understood that the present disclosure is illustrative and not to be considered in the limiting sense since the invention may be carried out by means other than those herewith specifically disclosed.

The figure of the drawing illustrates diagrammatically a plan view showing parts of the apparatus in cross-section.

The preferred form of the invention comprises a suitable light tight box 1 having its interior surfaces 2 coated with light absorbing material such as a dead black coating. Preferably, all exposed surfaces of the mountings of the various elements in the box are also light absorbing so that the only effective light available for test purposes is direct light from a source of diffused light. This source of light preferably comprises an ordinary electric light 4 having a frosted bulb. The electric light 4 may be a one hundred watt lamp which is preferably operated at ten percent below normal voltage and in this way the light may be run from an ordinary commercial electric line 5 without such variation as will seriously affect the readings.

The rays of diffused light are directed toward a photoelectric cell 6. Calibration adjustments are desirable and to this end, the cell is mounted for movement toward and from the source of light. This photoelectric cell preferably comprises what is known in the trade as a "Weston Photronic" cell which requires no batteries for operation and for practical purposes is non-variable during long periods of use. This cell 6 may be mounted upon suitable guide rods 7 which telescope into hollow tubes 8 and attached to an adjustment rod 9 with the head 10 thereof journalled to the photoelectric cell 6. A portion 11 of the adjustment rod 9 is screw threaded and passes through an adjustment knurled knob 12. A compression spring 14 mounted upon the adjustment rod 9 causes the base of the adjustment knob 12 to bear against the end of the light tight box 1, thereby determining the relative distance between the cell and light. By rotating the knob, the photoelectric cell 6 may be adjusted toward or from the electric light, depending upon the direction which the knob is rotated. The photoelectric cell 6 is connected with a delicate electric instrument either a milli-volt meter or a milli-volt ammeter 21. Preferably, the milli-ammeter is used.

A carrying slide 15, of the type commonly used in stereopticons, is mounted to reciprocate across the light tight box 1 between the light 4 and the cell 6 and with the openings through which the slide reciprocates provided with light valves 16 to prevent entrance of light into the box. This slide 15 is provided with windows which carry the standard material such as a sheet of opalescent glass 17 and also a sheet of test paper 18 in order that during the test, the slide 15 may be moved so that the standard and the test paper interchangeably occupy exactly the same position between the light and the cell.

The area of exposed opalescent glass and the area of the exposed paper is the same, preferably, a rectangular area about three inches by four inches. While the "Weston Photronic" cell at ordinary temperatures does not vary sufficiently with temperature changes as to seriously affect accurate readings, it is desirable that the apparatus be used in a reasonably constant temperature room.

In the use of the present apparatus, it has been found that both as to the opalescent glass and as to the paper, the entire areas of the mediums are effective upon the photoelectric cell, due primarily to the diffused light from the frosted bulb of the electric light and also to the diffusion produced by the opalescent glass and the diffusion through the paper caused by the fibers of the paper. Experience has shown that a direct diffused light from a diffusion bulb is more satisfactory than where reflectors or lenses are used to concentrate the light and a more definite reading is obtained over the entire area of the test materials without these accessories.

Preferably, the ends of the slide 15 are provided with stops 19 and 20 to insure that the test material and the standard are properly interchangeably positioned when the stops engage the sides of the light tight box. This interchange between the standard, namely, the opalescent glass, and the paper is preferably made at each test, that is, the reading for the standard is checked and then the test reading of the paper is made immediately thereafter.

In the practical operation of the device where the ordinary milli-volt or milli-ampere scale of the meter is used, it is preferable that the reading on the meter through the standard medium shall not be a zero reading on the scale but shall be some higher reading so that the test material may give a reading above or below this calibration point and the transparency of the material tested may then be determined by the simple mathematical formula previously herein specified.

The scale on the electrical instrument may also if desired be calibrated directly into terms of transparency. When so calibrated, the opalescent glass will give a definite reading on this scale, for example, it will read, 10, thus indicating it is passing ten percent of the light. In order, however, to obviate any possible variations of the metering elements during the operation of the instrument, the standard opal glass should be read for each test and with the unit scale, this glass should read upon its proper place in the scale, as for example, 10. If the reading for the standard is not in accord with the known factor, then calibration adjustments are made until the standard reading is correct. When this standard reading corresponds with the known factor for the standard and a unit scale is used, the reading through the paper then becomes direct and no calculations are required.

The calibration adjustment is dependent primarily on the amount of light falling upon the photoelectric cell. This adjustment may be made in various ways such as has been described by changing the relative distance between the source of light and the photoelectric cell and it may also be done by changing the effective intensity of the light from one level to another. A convenient way of doing this is by means of a rheostat 22 in the circuit for the light. It may also be convenient for calibration purposes to introduce a rheostat 24 in the circuit from the photoelectric cell 6. The primary purpose of the calibration is to obtain a predetermined starting point for readings on the metering device.

What we claim is:

A transparency meter for measuring transparency of newsprint paper comprising in combination a fixed source of diffused light, a photo-electric cell of the type which generates electrical current when exposed to light, an electrical meter electrically connected with said photo-electric cell, a light tight chamber enclosing said source of diffused light and said photo-electric cell with the interior surface of said chamber being light absorbing and non-reflecting, a slide holder transversely movable between the photo-electric cell and said source of light, windows of substantially identical shape and area provided in said slide holder, a transparency standard mounted in one window of the slide holder, the other window of the slide holder being adapted to carry a sheet of newsprint paper to be tested, means to guide said slide holder to interchangeably position said standard and said sheet of newsprint paper in substantially the same position between the photo-electric cell and said source of light with the central point of said windows coinciding substantially with the central axis extending between the center of the source of light and the center of said photo-electric cell, whereby the reading of said meter of said standard and said test newsprint paper may be successively made during the testing under substantially the same conditions, said photoelectric cell being substantially plane surfaced on the side toward said source of light and with the plane of said photo-electric cell being substantially parallel to the plane of the newsprint paper when the same is in position to be tested, means to adjust the photo-electric cell toward and from said slide with the plane surface of said photo-electric cell being maintained parallel with the plane of the said slide whereby symmetric illumination of said cell is obtained for all said adjustments thereof, and means exterior of said chamber operable to adjust the said photo-electric cell toward and from said slide.

MAYNARD D. McFARLANE.
WILLIAM BAUMRUCKER, Jr.